US00RE37417B1

(19) United States
(12) Reissued Patent
Koffron

(10) Patent Number: US RE37,417 E
(45) Date of Reissued Patent: Oct. 23, 2001

(54) VORTEX INHIBITOR FOR MOLTEN METAL DISCHARGE

(75) Inventor: Robert J. Koffron, Farmington Hills, MI (US)

(73) Assignee: Tetron, Inc., Farmington Hills, MI (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/450,271

(22) Filed: May 25, 1995

Related U.S. Patent Documents

Reissue of:
(64) Patent No.: 4,871,148
Issued: Oct. 3, 1989
Appl. No.: 07/230,065
Filed: Aug. 9, 1988

U.S. Applications:

(63) Continuation of application No. 08/277,374, filed on Jul. 19, 1994, now abandoned, which is a continuation of application No. 07/770,128, filed on Oct. 2, 1991, now abandoned.

(51) Int. Cl.[7] ..... B22D 41/10
(52) U.S. Cl. ..... 266/230; 266/227
(58) Field of Search ..... 222/591, 597, 222/594; 266/287, 45, 227, 229, 230, 236

(56) References Cited

U.S. PATENT DOCUMENTS

| | | | | |
|---|---|---|---|---|
| 2,718,389 | | 9/1955 | Perrin | 266/37 |
| 2,810,169 | | 10/1957 | Hofer | 22/79 |
| 3,814,407 | | 6/1974 | Meyers | 266/37 |
| 3,934,755 | | 1/1976 | Rheinlander et al. | 222/1 |
| 4,095,777 | | 6/1978 | Honaker | 266/45 |
| 4,215,739 | * | 8/1980 | Borghorst | 164/416 |
| 4,248,409 | | 2/1981 | Langlitz et al. | 266/286 |
| 4,307,269 | | 12/1981 | Rotthaus | 200/20 |
| 4,310,278 | | 1/1982 | Wenzel et al. | 414/332 |
| 4,350,241 | | 9/1982 | Wenzel | 198/311 |
| 4,360,305 | | 11/1982 | Dorsch | 414/208 |
| 4,390,170 | | 6/1983 | Schaefer, IV et al. | 266/272 |
| 4,401,296 | | 8/1983 | Ploetz et al. | 266/236 |
| 4,462,574 | | 7/1984 | Keenan et al. | 266/45 |
| 4,468,013 | | 8/1984 | LaBate | 266/272 |
| 4,494,734 | | 1/1985 | LaBate et al. | 266/45 |
| 4,526,349 | | 7/1985 | Schwer | 266/45 |
| 4,553,743 | | 11/1985 | LaBate, II et al. | 266/272 |
| 4,556,097 | | 12/1985 | Burmeister | 164/137 |
| 4,601,415 | * | 7/1986 | Koffron | 222/597 |
| 4,634,106 | | 1/1987 | LaBate, II | 266/236 |
| 4,706,944 | | 11/1987 | Lee | 266/272 |
| 4,709,903 | | 12/1987 | LaBate | 266/227 |
| 4,725,045 | | 2/1988 | Cutre et al. | 266/230 |

FOREIGN PATENT DOCUMENTS

| | | |
|---|---|---|
| 286132 | 6/1922 | (DE) . |
| 1063860 | 5/1952 | (FR) . |
| 52-22602 | 6/1977 | (JP) . |
| 59-47314 | 3/1984 | (JP) . |

* cited by examiner

*Primary Examiner*—Scott Kastler
(74) *Attorney, Agent, or Firm*—Brooks & Kushman P.C.

(57) ABSTRACT

An improved vortex inhibitor for separating slag from molten metal during the discharge of molten metal through a nozzle includes a uniform castable refractory body with a regular pyramidal shape. The tapered body includes swirl obstructing surfaces extending along its length and is geometrically proportioned so that the center of gravity is closer to the apex than the center of buoyancy of the body. Preferably, the outermost parts of the base intersect a circle whose diameter is larger than the diameter of the nozzle opening and defining a base length dimensionally fixed with respect to the base length within a predetermined range. Preferably, the longitudinal height is in the range of 0.5 to 1.0 times the diameter of the circumscribed circle. A modified, spherically configured body which can be rolled into position also is geometrically proportioned to keep the center of gravity spaced from the center of buoyancy and closer toward the apex of the modified shape.

9 Claims, 2 Drawing Sheets

FIG 1
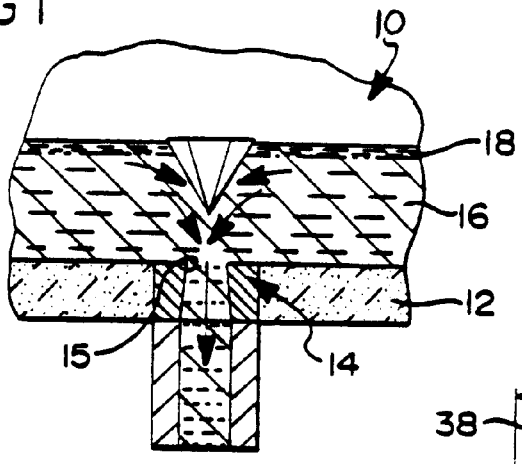
FIG 2
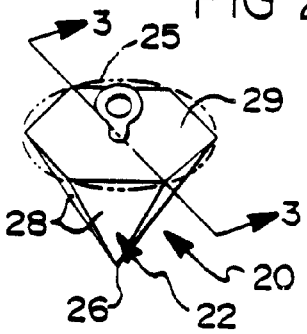
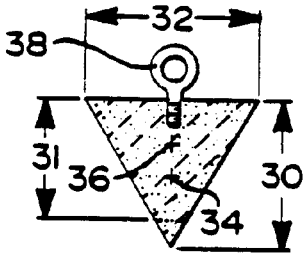
FIG 3
FIG 4
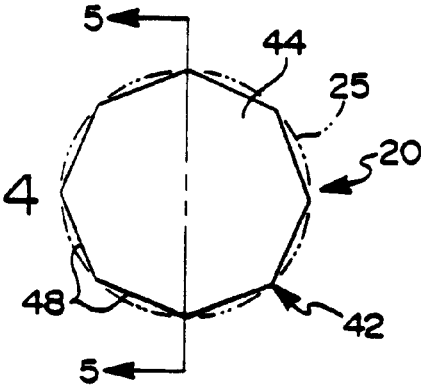
FIG 5
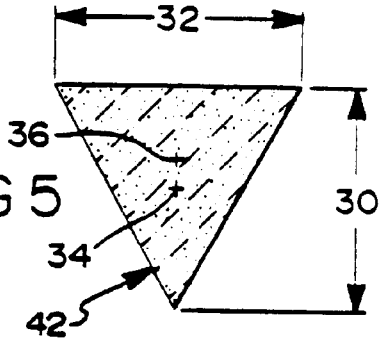
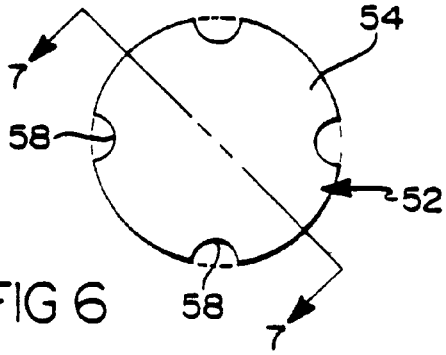
FIG 6
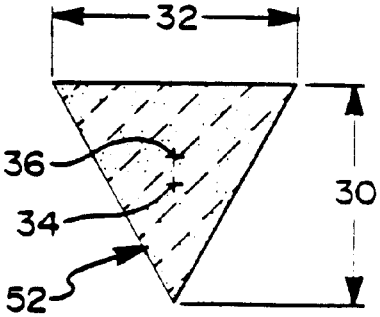
FIG 7

FIG 8
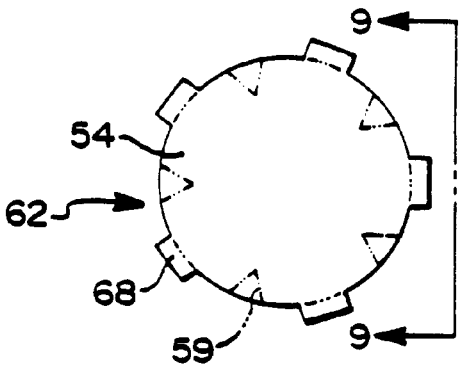
FIG 9
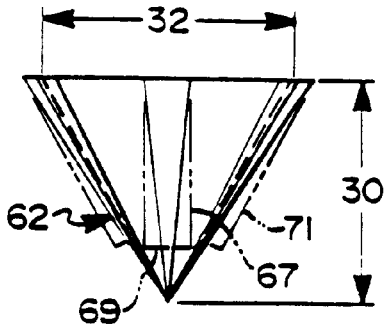
FIG 10
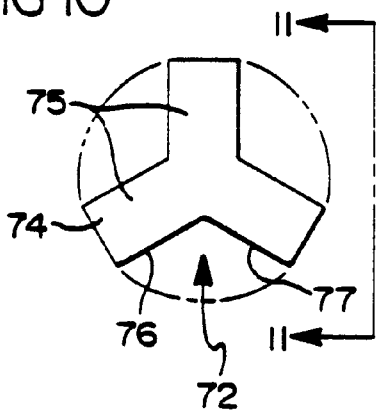
FIG 11
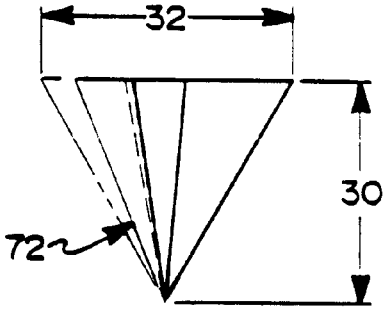
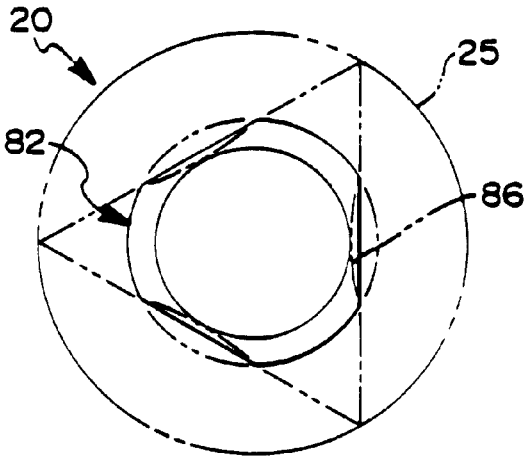
FIG 12
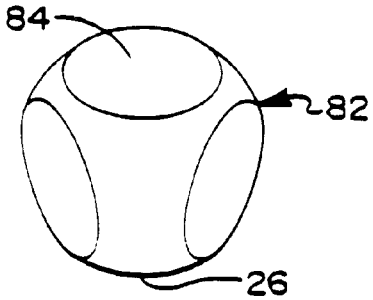
FIG 13

VORTEX INHIBITOR FOR MOLTEN METAL DISCHARGE

Matter enclosed in heavy brackets [ ] appears in the original patent but forms no part of this reissue specification; matter printed in italics indicates the additions made by reissue.

*This is a continuation of reissue application Ser. No. 08/277,374 filed on Jul. 19, 1994 now abandonded, which is a continuation of reissue application Ser. No. 07/770,128 filed Oct. 2, 1991 now abandonded which is a reissue of U.S. Pat. No. 4,871,148 issued Oct. 3, 1989.*

BACKGROUND OF THE INVENTION

I. Field Of The Present Invention

The present invention relates generally to metal making apparatus, and more particularly to apparatus for separating slag from molten metal as the molten metal is transferred from a receptacle.

II. Description Of The Prior Art

In metal making processes, the flow of molten metal through the discharge nozzle of a receptacle such as a furnace, tundish or ladle induces a swirl to the molten metal above the discharge nozzle. At a critical level, the energy of the swirl creates a vortex, whereby the slag layer lying on top of the molten metal is sucked into the nozzle and mixes with the molten metal being poured through the nozzle. Several devices have been known to inhibit introduction of the slag to the discharge nozzle in order to avoid the contamination of the poured metal. Before such devices were introduced, it was necessary to terminate pouring by closing the nozzle while the molten metal is at a level above the point at which suction action of the vortex draws slag downwardly into the discharge nozzle. Such a procedure traps a large amount of molten metal in the receptacle and reduces effective yield of the melt.

U.S. Pat. No. 4,494,734 to LaBate, et al. discloses a dart incorporating a depending guide member engageable in the tap hole to direct accurate placement of the stopper body toward the tap hole. The patent discloses alternate configurations of the stopper body which are taught to cause swirling of the metal. The patent teaches that visual observation of the swirling metal and slag indicates when tapping of the furnace is to be terminated.

Many of the previously known devices for restricting slag from flowing through the discharge nozzle were in the form of plugs which lodge in the discharge nozzle to prevent further pouring through the nozzle. For example, U.S. Pat. No. 2,810,169 to Hofer discloses the use of a slag dam as well as a plug 3 which is mechanically controlled for placement during the pouring operation. However, such units are large and expensive to build, and numerous parts are subjected to the harsh environmental conditions of molten metal. Consequently, the cost of repairing or replacing the parts substantially increases the costs of metal making.

Other known devices for separation of slag and molten metal during discharge comprise bodies which are self-supporting in the molten metal layer. This is accomplished by constructing the body with a specific gravity between the specific gravity of the molten metal and the specific gravity of the slag layer. One such device with such controlled density is a spherical body which is drawn by the vortex into the nozzle and lodges in the nozzle to obstruct further flow. However, such a device is difficult if not impossible to remove, and frequently required replacement of the nozzle sleeve.

U.S. Pat. No. 4,526,349 to Schwer discloses an annular disc having a specific gravity which permits it to separate slag at the interface between the slag and steel. However, this patent also contemplates that a spherical body is drawn by the suction of the vortex into the discharge nozzle opening to cut off fluid flow. The patent discloses that two discrete articles are necessary. While the ring is taught to counter the effect of the vortex formed over the discharge nozzle, the sphere merely closes off pouring when slag is about to be introduced to the discharge nozzle. Consequently, the problems previously discussed are encountered.

A self-supporting device particularly developed to inhibit the vortex formation was disclosed in the present applicant's previous U.S. Pat. No. 4,601,415. That patent defined a tapered, polygonal body designed to generally conform with the shape of the vortex along its length so as to extract energy from swirling movement of the molten metal. Unlike previously known plug bodies, the patented vortex inhibitor was taught to be self-orienting by its vortex conforming shape. However, to assure apex downwardly positioning, the patent also disclosed a weighting means embedded in the refractory body. Moreover, while the patent teaches that the shape of a polygonal cross-section may be changed to adjust the degree of plugging or the throttling effect as the body enters the discharge nozzle, it was found that changing the shape of the vortex inhibitor from the tetrahedral shape of the preferred embodiment could affect the orientation stability of the body. In particular, as the body is subjected to outside influences during placement in the molten metal bath or during movement of the receptacle from which the molten metal is being discharged, the geometrical proportion can disrupt the apex downward orientation desired. Moreover, the use of a separate weighting means, such as a core, substantially increases the complexity of producing the vortex inhibitor and has been disfavored.

SUMMARY OF THE PRESENT INVENTION

The present invention overcomes the abovementioned disadvantages by providing a vortex inhibitor made from a uniform castable refractory body having a regular pyramidal shape geometrically proportioned to maintain the center of gravity below the center of buoyancy and closer to the apex. As a result, the tapered body orients itself apex downwardly in the molten metal without the time consuming and laborious efforts require to embed a weighting core within the refractory body. Furthermore, by uniformly tapering the body with the predetermined geometrical proportions of the present invention, the body making molds can be partially or fully filled without affecting the relative positions of the center of gravity and the center of buoyancy to maintain the self-orienting characteristic of the body.

In general, the vortex inhibitor of the present invention comprises a body made of uniform castable refractory material. It is to be understood that the term uniform does not require complete homogeneity of material and includes the intermixture of shot, steel fiber or other materials which may be consistently mixed with a castable refractory material to adjust the specific gravity of the body. In any event, the specific gravity of the uniform mixture is selected so that it is buoyantly supported at the interface of the slag layer and the molten metal layer.

The body has a substantially regular pyramidal shape. As used herein, the term regular is to be understood as meaning defined by a base substantially perpendicular to the longitudinal axis, whereby the body has a substantially consistent shape at any perpendicular cross-section and where each such cross-section is centered on the longitudinal axis of the body. Moreover, the terms pyramidal shape mean any body tapered toward an apex from a base, regardless of whether the base is formed as a simple or complex polygon, or a rounded or circular figure. The taper is preferably consistent along the length of the body. Such bodies generally conform with the shape of the vortex formed by the swirling molten metal above the discharge nozzle. Moreover, as opposed to previously known plugs or darts used for the purpose of plugging or throttling the nozzle, the body is formed as a vortex inhibitor, that is, it includes some means for inhibiting continuous laminar flow about the body. For example, vortex inhibiting surface features include discrete, noncontinuous sides such as those extending from a regular polygonal base or a complex polygonal base, as well as flats, recesses or projections extending lengthwise along the body.

The shape of the body is further defined as geometrically proportioned to maintain the center of gravity below the center of buoyancy. In bodies having a regular pyramidal shape as discussed above, the geometric proportion may be defined in relation to a base length defined as the diameter of a circle scribed by the outermost points of the base of the body. In this case, the ratio of the longitudinal height dimension of the body to the base length is preferably within the range of 0.5:1 to 1:1. Optimally, the ratio of the longitudinal height to the base length is one-half of the square root of two to one ($\sqrt{2}/2:1$) i.e. the longitudinal length is about 0.707 times the base length. Such structural relationships of the uniform castable refractory body with controlled density assure that the center of gravity is sufficiently separated from and below the center of buoyancy toward the apex to buoyantly support the body apex downward. Of course, the base length is selected to be longer than the diameter of the discharge nozzle so that the body can be lodged in the nozzle.

Thus the present invention provides a uniform body which is simple to make since it is easily formed by pouring a single mixture into a mold. Nevertheless, the body is automatically self-orienting so that its apex extends downwardly toward the discharge nozzle of a molten metal receptacle. As a result, the vortex inhibitor is self-aligning within the vortex swirl caused by the discharge of molten metal. In addition, a vortex inhibitor body constructed in accordance with the present invention maintains the separation of the center of gravity and the center of buoyancy relationship regardless of the number of sides, projections, recesses or other configurations used to deenergize the vortexinducing swirl. As a result, the vortex inhibiting body can be constructed regardless of the throttling ratio necessary to interrupt discharge of the molten metal through the nozzle while maintaining separation between the slag layer and molten metal in the receptacle during a pouring operation.

BRIEF DESCRIPTION OF THE DRAWINGS

The present invention will be more clearly understood by reference to the following detailed description of a preferred embodiment when read in conjunction with the accompanying drawing in which like reference characters refer to like parts throughout the views and in which:

FIG. 1 is a elevational view of a molten metal receptacle containing a vortex inhibitor constructed in accordance with the present invention;

FIG. 2 is a perspective view of the vortex inhibitor shown in FIG. 1;

FIG. 3 is a sectional view taken substantially along the line 3—3 in FIG. 2;

FIG. 4 is a top plan view of a modified vortex inhibitor constructed in accordance with the present invention;

FIG. 5 is a sectional view taken substantially along the line 5—5 in FIG. 4;

FIG. 6 is a top plan view of a further modification of a vortex inhibitor body according to the present invention;

FIG. 7 is a sectional view taken substantially along the line 7—7 in FIG. 6;

FIG. 8 is a top plan view of another modified vortex inhibitor constructed in accordance with the present invention;

FIG. 9 is an elevational view taken substantially along the line 9—9 in FIG. 8;

FIG. 10 is a top plan view showing further modification of a vortex inhibitor constructed in accordance with the present invention;

FIG. 11 is an elevational view taken substantially along the line 11—11 in FIG. 10;

FIG. 12 is a top plan view of a further embodiment of a vortex inhibitor constructed according to the present invention; and FIG. 13 is a perspective view of the body shown in FIG. 12.

DETAILED DESCRIPTION OF A PREFERRED EMBODIMENT

Referring first to FIG. 1, a molten metal receptacle 10 is shown having a bottom wall 12 with a discharge nozzle 14. The receptacle 10 can be a furnace, ladle, tundish or other receptacle from which molten metal is discharged through the nozzle 14. Regardless of the type of receptacle, the receptacle 10 is shown containing a layer of molten metal 16. A layer of slag 18, having a specific gravity less than the specific gravity of the molten metal 16, rests on top of the layer of molten metal 16. A vortex inhibitor 20 according to the present invention is shown supported at the interface of the slag layer 18 and the molten metal layer 16 within the receptacle 10.

Referring now to FIG. 2, the vortex inhibitor 20 comprises a body 22 having a hexagonal base 24. The outermost points of the base or vertices of the hexagon intersect a circle circumscribed about the base. The diameter of the circle is of course larger than the diameter of the nozzle opening 15 so that only a portion of the body becomes lodged within the nozzle. Due to the harsh environmental conditions within the furnace, the diameter of the circle may be substantially larger than the diameter of the nozzle opening 15 so that erosion of the body does not reduce the maximum diameter of the outermost points of the base to less than the diameter of the nozzle opening.

The body 22 tapers downwardly from the base toward an apex 26. The resulting pyramidal shape is substantially regular so that each of the triangular sides 28 of the body 22 taper at substantially the same slope toward the apex 26. However, some variation in the slope of the sides can be accommodated.

The apex 26 can be automatically oriented downwardly when the body is supported in the molten metal 16 by assuring that the center of gravity 34 of the pyramid extends below the center of buoyancy 36. In the present invention, this relationship is established by geometrically proportioning the shape of the vortex inhibitor, thereby eliminating the need for a separate weighting means between the center of buoyancy and the apex 26. While the center of gravity is a function of the shape of the body, the center of buoyancy is also a function of the body shape as well as the relative specific gravities of the molten metal 16 and the uniform castable refractory.

In particular, the body of the vortex inhibitor 20 is geometrically proportioned so that the longitudinal height 30 of the body is within the range of 0.5 to 1 times the diameter 32 of the circumscribed circle 25. Optimally, the longitudinal height 30 from the base to the apex is one-half the square root of two times the base length, or approximately 0.707 times the base length 32, provides sufficient stability without permitting excessive penetration of the apex into the nozzle opening which interferes with throttling. A vortex inhibitor body may also be truncated short of an actual apex as shown at 31 so long as the narrowest portion of the body can enter the nozzle opening 15. However, the base length 32 to height 30 relationship still applies.

The preferred controlled density of the uniform refractory material occurs when the specific gravity of a body is greater than, and preferably much greater than, about 0.296 times the specific gravity of the metal. The minimum figure represents the lowest specific gravity with which the invention is expected to operate in the absence of a slag layer. Since a significant amount of slag is typically involved, the much greater relationship is important as a practical matter.

Referring now to FIG. 4, the vortex inhibitor 20 is there shown comprising a body 42 having an octagonal base 44. As with the embodiment shown in FIG. 2, the vertices of the octagonal base 44 intersect a circle 25 circumscribed about the base and having a diameter dimensioned to exceed the diameter of the nozzle opening 15. In addition, the body 42 tapers downwardly toward an apex 26 due to substantially regular manner. As shown in FIG. 5, the longitudinal height 30 is limited to the preferred range with respect to the base length 32 so as to assure that the uniform castable refractory material is shaped to assure that the center of buoyancy 34 is above the center of gravity 36 over the apex.

FIG. 6 shows a further modification of a regular pyramidal body of a vortex inhibitor 20. As shown in the drawing, a body 52 has a substantially circular base 54. However unlike the flat sides of the bodies 22 and 42 shown in FIGS. 2 and 4 respectively, surfaces for inhibiting the vortex are formed by recesses 58 extending along the sides of the refractory body 52. Nevertheless, the periphery of the circular base 54 has a base length 32 related to the longitudinal height 30 in the same manner as discussed with respect to FIGS. 2 and 4 as shown in FIG. 7.

The embodiment as shown in FIG. 8 is similar to FIG. 6 except that the vortex inhibiting means is provided in the form of projections extending outwardly from the periphery of a substantially conical body 62. Like the recesses 58 shown in the body 52, a projection 62 can be tapered from the base toward the apex 26. Alternatively, like the recesses 58 in the body 52, the projections 68 can be of uniform width from the base 54 to the apex 26 as shown in phantom line at 67. Moreover, while the recesses 58 or the projections 68 are most effective when extending along the entire length from the base to the apex, it may be understood that such projections and recesses may be truncated short of the entire length of the body as shown in phantom line at 69. Variations in the width and the depth of the projections or recesses are also possible, as indicated by the constant height projections illustrated in phantom line at 71 in FIG. 9. In any event, even if the body itself is truncated, the base length to longitudinal height relationship is consistent with the previous embodiments as shown in FIG. 9. In addition, a combination of vortex inhibiting surfaces, for example, a combination of recesses and projections, can also be employed as desired without departing from the scope of the present invention. As a further example, flat sided recesses 59 are shown in phantom line at 59 in FIG. 8.

While the previously described embodiments have a base with a simple geometrical shape, it is also to be understood that complex geometrical shapes can also be employed in producing the vortex inhibitor according to the present invention. FIG. 10 discloses a refractory body 72 having a complex polygonal base 74. In particular, the base 74 combines a plurality of simple polygonal shapes emanating outwardly from the center of the body 72. The intersection of the rectangular polygons 75 form planar surfaces 76 and 77 which intersect in a "V" and inhibit vortex action, while the depth of the V-shaped recesses control the throttling effect once the body penetrates the nozzle opening 15. Again, the base length 32 to longitudinal height 30 ratio is consistent with the embodiments previously discussed as shown in FIG. 11.

Each of the above-described embodiments can include a simple ring 38 partly embedded in the body as shown in FIG. 3, or other looped support member, for initially introducing the vortex inhibitor into the receptacle with the aid of a gaff, control arm or the like. However, some throttling bodies have been positioned by rolling a spherical body down a chute or other guide to a position over the nozzle 14. A vortex inhibitor 20 which can be positioned in the same manner is shown in FIG. 12.

A substantially spherical body 82 has been modified to include vortex inhibiting surfaces by cutting regular recesses in the spherical structure. The modification shown in FIGS. 12 and 13 is formed by truncating the sphere at the intersections of a regular tetrahedron and the sphere. The circle 25 circumscribing the base of the tetrahedron defines the base length 32 used to determine the height dimension from the base to the apex of the tetrahedron. The flat sides 86 taper downwardly toward the apex 26 without substantially interfering with the ability of the body to roll.

As in the previously discussed embodiments, the body 82 is still configured so that the center of gravity 34 is below the center of buoyancy 36 and towards the apex of the body 82. The truncated sphere 82 formed by the tetrahedral truncation relationship maintains this geometrical relationship regardless of which side 84 is positioned as the base of the geometrical shape. In addition, it will be understood that the surface features applied to the generally spherical body 82 need not be planar, and that recesses tapering toward an apex 16 from a base 84, as shown in phantom line at 86 in FIG. 12, conform the body with the shape of the vortex formed in the molten metal.

In any event, the vortex inhibitor 20 according to the present invention is easily positioned in previously known manners, for example, by hooking a gaff through the support loop 38 and positioning it over the nozzle 14 in the molten metal layer 16 contained in the receptacle 10. Despite manipulation with the gaff or external forces applied to the receptacle 10, the vortex inhibitor 20 remains oriented with its apex downward so as to inhibit the swirling energy of the molten metal above the discharge nozzle 14. Alternatively, with the embodiment shown in FIGS. 12 and 13, the vortex inhibitor can be rolled along a suitable chute to the position over the nozzle opening 15.

Regardless of the method by which the vortex inhibitor is introduced into the layer of molten metals, the specific gravity of the vortex inhibitor supports it at the interface of the slag layer 18 and the molten metal 16. Moreover, the shape of the vortex inhibitor 20 provides inertia against the swirling motion of the molten metal above the discharge nozzle 14 and inhibits the formation of vortex suction which draws the slag layer into mixture with the molten metal pouring through the nozzle. Moreover, the vortex inhibitor 20 is easy to make since the body is formed of a uniform material which can be simply poured and does not require the insertion or embedding of a weighting core.

Having thus described the present invention, many modifications thereto will become apparent to those skilled in the art to which it pertains without departing from the scope and spirit of the present invention as defined in the appended claims.

I claim:

1. A vortex inhibitor for molten metal pouring from a discharge nozzle comprising:

a uniform castable refractory body having a specific gravity less than the specific gravity of molten metal and having a regular pyramidal shape geometrically proportioned so that its center of gravity is below its center of [buoyancy] *buoyant support* and toward the apex of said pyramidal shape, wherein said geometric proportion comprises a height to base length ratio in the range of 0.5:1 to 1:1, wherein the base length is defined as the diameter of a circle circumscribing the outermost edges of the base, whereby said body is self-orienting in an apex downward position when supported in molten metal.

2. A vortex inhibitor as defined in claim 1 wherein said height to base length ratio is one-half of the square root of 2 to 1.

3. A vortex inhibitor as defined in claim 1 wherein said body has a generally circular base and longitudinal peripheral recesses.

4. A vortex inhibitor as defined in claim 1 wherein said body has a generally circular base and longitudinal, peripheral projections.

5. A vortex inhibitor as defined in claim 1 wherein said body includes complex polygonal base.

6. A vortex inhibitor as defined in claim 1 wherein said base is hexagonal.

7. A vortex inhibitor as defined in claim 1 wherein said base is octagonal.

8. A vortex inhibitor as defined in claim 1 wherein said body comprises a truncated spherical body having a base, and a plurality of surfaces tapering from said base toward an apex, wherein said tapering surfaces geometrically proportion said body with said center of gravity below said center of [buoyancy] *buoyant support* and toward the apex.

*9. A vortex inhibitor for improving the volume of molten metal available from a receptacle when pouring through a discharge nozzle, the inhibitor consisting essentially of:*

*a uniform castable refractory body not shaped as a regular tetrahedron having a selected specific gravity less than the specific gravity of molten metal and having a regular pyramidal shape geometrically proportioned by shaping other than as a regular tetrahedron so that its center of gravity is below its center of buoyant support and toward the apex of said regular pyramidal shape, whereby said body is self-orienting in an apex downward position when supported in molten metal.*

* * * * *